US010666177B2

(12) United States Patent
Hilscher et al.

(10) Patent No.: US 10,666,177 B2
(45) Date of Patent: May 26, 2020

(54) OPERATING AN INVERTER FOR COUPLING AN ELECTRIC MACHINE, DESIGNED FOR OPERATION ON AC VOLTAGE, WITH AN AC VOLTAGE NETWORK

(71) Applicant: SIEMENS AKTIENGESELLSCHAFT, München (DE)

(72) Inventors: Martin Hilscher, Erlangen (DE); Peter Kalbfleisch, Obermichelbach (DE); Rainer Zurowski, Forchheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/340,609

(22) PCT Filed: Sep. 18, 2017

(86) PCT No.: PCT/EP2017/073392
§ 371 (c)(1),
(2) Date: Apr. 9, 2019

(87) PCT Pub. No.: WO2018/068988
PCT Pub. Date: Apr. 19, 2018

(65) Prior Publication Data
US 2020/0052632 A1 Feb. 13, 2020

(30) Foreign Application Priority Data
Oct. 11, 2016 (EP) .................................... 16193303

(51) Int. Cl.
*H02P 21/05* (2006.01)
*H02P 27/06* (2006.01)
*H02P 21/14* (2016.01)
*H02P 21/00* (2016.01)
*H02P 21/20* (2016.01)

(52) U.S. Cl.
CPC .......... *H02P 21/05* (2013.01); *H02P 21/0003* (2013.01); *H02P 21/141* (2013.01);
(Continued)

(58) Field of Classification Search
CPC ............. H02P 27/06; H02P 23/04; H02P 6/10
See application file for complete search history.

(56) References Cited

U.S. PATENT DOCUMENTS 5,083,039 A * 1/1992 Richardson ........... F03D 7/0272
290/44
9,287,812 B2 * 3/2016 Nondahl ................. H02P 21/00
(Continued)

FOREIGN PATENT DOCUMENTS

DE 1806769 A1 10/1969
DE 19756955 A1 7/1999
(Continued)

OTHER PUBLICATIONS

International Search Report issued by the European Patent Office in International Applicaion PCT/EP2017/073392.

*Primary Examiner* — Bickey Dhakal
*Assistant Examiner* — Said Bouziane
(74) *Attorney, Agent, or Firm* — Henry M. Feiereisen LLC

(57) ABSTRACT

A method for operating an inverter for coupling an electric machine designed for operation on AC voltage, to an AC voltage network, includes the steps of determining a torque-related machine current component composed of electrical machine currents of the electrical machine, detecting an actual value for a magnetic flux, determining an actual value of a machine torque of the electric machine by linking the detected magnetic flux to the torque-related machine current component, determining a torque difference between the actual value of the machine torque and a setpoint value of (Continued)

the machine torque of the electric machine, filtering the torque difference by a bandpass filter which is tuned to a machine-side natural frequency, determining a compensation signal by processing a filter output signal of the bandpass filter, and superimposing the compensation signal on the network control signal and/or the machine control signal.

8 Claims, 3 Drawing Sheets

(52) U.S. Cl.
CPC .............. *H02P 21/20* (2016.02); *H02P 27/06* (2013.01); *H02P 2201/13* (2013.01)

(56) References Cited

U.S. PATENT DOCUMENTS

| | | | | |
|---|---|---|---|---|
| 9,385,585 | B2* | 7/2016 | Geyer | .................... H02M 7/487 |
| 2008/0179122 | A1* | 7/2008 | Sugawara | ................ B60K 6/46 |
| | | | | 180/65.245 |
| 2009/0256518 | A1 | 10/2009 | Kitanaka et al. | |
| 2011/0140438 | A1* | 6/2011 | Delmerico | ................ H02P 9/42 |
| | | | | 290/55 |
| 2012/0161685 | A1* | 6/2012 | Geyer | ..................... H02M 1/12 |
| | | | | 318/503 |
| 2019/0238077 | A1* | 8/2019 | Azar | ....................... F03D 9/257 |

FOREIGN PATENT DOCUMENTS

| | | |
|---|---|---|
| DE | 102004030974 A1 | 2/2006 |
| DE | 102011079995 A1 | 1/2013 |
| EP | 2073375 A1 | 6/2009 |
| JP | 3679915 B2 | 8/2005 |
| KR | 20160002300 A | 1/2016 |
| RU | 2141719 C1 | 11/1999 |
| RU | 2392732 C1 | 6/2010 |
| RU | 2430273 C1 | 9/2011 |
| WO | WO 2006/113230 A1 | 10/2006 |
| WO | WO 2014033201 A2 | 3/2014 |

* cited by examiner

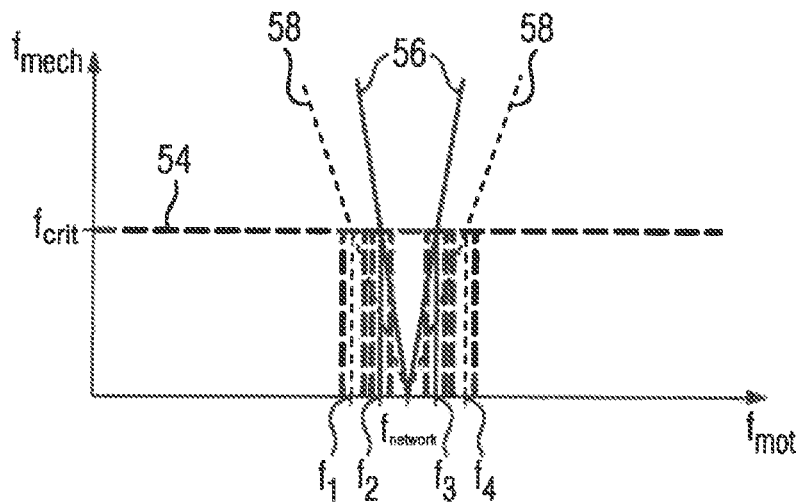
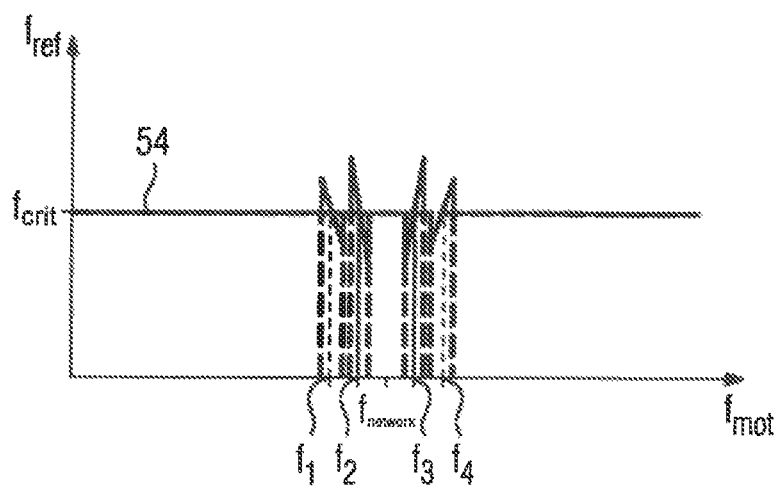

OPERATING AN INVERTER FOR COUPLING AN ELECTRIC MACHINE, DESIGNED FOR OPERATION ON AC VOLTAGE, WITH AN AC VOLTAGE NETWORK

CROSS-REFERENCES TO RELATED APPLICATIONS

This application is the U.S. National Stage of International Application No. PCT/EP2017/073392, filed Sep. 18, 2017, which designated the United States and has been published as International Publication No. WO 2018/068988 and which claims the priority of European Patent Application, Serial No. 16193303.1, filed Oct. 11, 2016, pursuant to 35 U.S.C. 119(a)-(d).

BACKGROUND OF THE INVENTION

The invention relates to a method for operating an inverter for coupling an electric machine, designed for operation on AC voltage, to an AC voltage network with which a network-side converter of the inverter connected to the AC voltage network is electrically coupled by means of a DC intermediate circuit to a machine-side converter of the inverter connected to the electric machine, wherein conversion of electric energy by the network-side converter is controlled by means of a network control signal and conversion of electric energy by the machine-side converter is controlled by means of a machine control signal of the control unit. The invention also comprises a computer program product. Finally, the invention also comprises a control unit for operating an inverter for coupling an electric machine, designed for operation on AC voltage, to an AC voltage network to which end the inverter comprises a network-side converter connected to the AC voltage network and a machine-side converter connected to the electric machine, which, for the electric coupling, are connected to a DC intermediate circuit, wherein the control unit comprises a network-side connector for connection to the network-side converter and is designed to provide at the network side a network control signal to control the network side converter and wherein the control unit comprises a machine-side connector for connection to the machine-side converter and is designed to provide at the machine-side connector a machine control signal to control the machine-side converter.

Methods according to the invention for operating such inverters and control units for the control thereof are known in the prior art, for example from DE 10 2000 11079 905 A1, which discloses a method for operating a drive system. Inverters of the generic type are used to couple one or more electric machines, in particular rotating electric machines, to the AC voltage network, in particular a multiphase, preferably three-phase, AC voltage network. Such inverters are typically used with high powers, for example one or more MW or more. Such high powers give rise to special requirements because the operation of the electric machine with an inverter can result in interactions with the AC voltage network. Since the electric machine is as a rule designed for operation with AC voltage or AC current, it is necessary for the inverter to establish an energy-related coupling between the AC voltage or AC current on the network side and an AC voltage or AC current on the machine side. To this end, the network-side converter is provided, which is connected with its AC voltage side or AC current side to the AC voltage network and with its DC current side to the DC intermediate circuit. In addition, the inverter comprises the second machine-side inverter, which is connected on DC current side to the DC intermediate circuit and on the AC voltage side or AC current side to the electric machine. Hence, the two converters are electrically coupled to one another by the DC intermediate circuit so that energy can flow from the AC voltage network to the electric machine and preferably also vice versa.

A converter is an electric facility used for energy conversion. The converter establishes an electric coupling between an AC voltage or AC current on one side and a DC voltage or DC current on the other. To this end, as a rule, the converter comprises a plurality of semiconductor switches, which are suitably controlled on the basis of a control signal, namely the network signal or the machine signal, in order to convert the energy in the specified way. With the powers to be converted in the present case, as a rule, thyristors are provided as semiconductor switches. However, basically, the semiconductor switches can also be formed by transistors, for example bipolar transistors, field-effect transistors or the like.

If the inverter only comprises the machine-side and network-side converter, the electric energy supplied to the DC intermediate circuit by one of the converters must be dissipated again by the other one of the two converters. Hence, the converted power is to be adjusted by controlling the two converters by means of the control signals of the control unit assigned to them. The energy store for the DC intermediate circuit is provided by an electric coil with an inductor corresponding to the electric energy to be stored.

During use as prescribed, oscillating torques can occur on the electric machine, in particular interharmonic oscillating torques, which can be caused by the fact that a network side and machine side of the inverter cannot always be completely decoupled. As a rule, the amplitudes of the oscillating torques are comparatively low, frequently less than 2% of a rated torque. However, if mechanical natural frequencies of the electric machine are excited, for example natural frequencies, which are less than 50 Hz, this may give rise to much higher oscillating torques on the machine side, in particular high oscillating torques, which can, in particular, also result in critical operating states.

To avoid this problem, it can be provided that a rated frequency and a pole pair number of the electric machine for stationary operation can be selected such that critical excitation of natural frequencies can be avoided, for example using a Campbell diagram. This measure is obviously only suitable for electric machines operated in steady state under fixed predetermined operating conditions.

If, on the other hand, it is provided that the electric machine can assume different operating states, it can be provided that so-called skip frequency bands are provided which define frequency ranges, which, in operation as prescribed, cannot be actuated in steady state. Even though this method has proven itself, it has still been found to be disadvantageous in that it is inflexible with respect to loading of the electric machine. This is inter alia an obstacle with regard to process control because there is a possibility that required operating conditions cannot be operated in steady state. Namely, a change in a load or the network frequency can, for example, have the result that the defined frequency ranges no longer match the natural frequencies that are actually present and hence it is no longer possible to avoid the above-described problem of the excitation of oscillating torques.

A further possibility consists in the detection of real actual torques or actual torsional moments by suitable sensors and their attenuation by controlling suitably by means of the control unit. Such a procedure is known, for example, from WO 2006/113230 A1 and also from EP 2 073 375 A1. However, this measure has the drawback that effort is required to measure the mechanical properties on the electric machine, in particular in the case of varying combinations of inverters with electric machines, this can entail a high degree of effort not only with respect to structural requirements, but also with respect to the implementation of a suitable control system.

The invention is based on the object of providing an improved method for operating an inverter and a control unit for this purpose.

SUMMARY OF THE INVENTION

To achieve the object, the invention suggests a method, a computer program product and a control unit as claimed in the independent claims.

Further advantageous embodiments may be derived from features of the dependent claims.

With regard to a proper method, the invention in particular suggests that the method comprise the steps:
  determining a torque-related machine current component comprising electric machine currents of the electric machine,
  detecting an actual value for a magnetic flux,
  determining an actual value of a machine torque of the electric machine by linking the detected magnetic flux to the torque-related machine current component,
  determining a torque difference between the actual value of the machine torque and a setpoint value of the machine torque of the electric machine,
  filtering the torque difference by means of a bandpass filter, which is tuned to a machine-side natural frequency,
  determining a compensation signal by processing a filter output signal of the bandpass filter, and
  superimposing the compensation signal on the network control signal and/or the machine control signal.

With regard to a computer program product, the invention in particular suggests that the computer program product comprise a program for a computing unit with program code sections of a program for carrying output the steps of the method according to the invention when the program is executed by the computing unit so that the computing unit determines at least one compensation signal for the network control signal and/or the machine control signal.

With regard to a generic control unit, the invention in particular suggests that the control unit is designed
  to determine a torque-related machine current component composed of electric machine currents of the electric machine,
  to detect an actual value for a magnetic flux,
  to determine an actual value of a machine torque of the electric machine by linking the detected magnetic flux to the torque-related machine current component,
  to determine a torque difference between the actual value of the machine torque and a setpoint value of the machine torque of the electric machine,
  to filter the torque difference by means of a bandpass filter, which is tuned to a machine-side natural frequency,
  to determine a compensation signal by processing a filter output signal of the bandpass filter and
  to superimpose the compensation signal on the network control signal and/or the machine control signal.

The invention is based on the principle that modulation of a control factor enables modulation of the electric machine. Such modulation enables the generation of oscillation power in the electric machine and hence also an oscillating torque in the air gap by means of which the interharmonics in the air-gap torque can be compensated. In particular, the invention only requires variables that are in any case available on the inverter side. In addition, there is no need for technical data relating to the electric machine, in particular with respect to its mechanical properties, to be available. Preferably, substantially no mechanical data on the electric machine or the entire shaft train is required, whereas electric machine data is as a rule always known with the control parameters, except, for example, a moment of inertia or a natural frequency of the drive train, in particular shaft train, which can include the electric machine.

The effective magnetic flux can be determined from detected output voltages and output currents of the machine-side converter. These electric variables are available in the inverter. As a result, it is also possible to determine the effective torque of the electric machine.

According to one advantageous development, it is suggested that frequency ranges for interharmonics are determined using a network frequency and a machine frequency. This enables the frequency ranges for the interharmonics to be determined using variables available in the inverter in a simple manner. Therefore, no separate sensors and/or the like are required.

According to one advantageous development, it is suggested that the method only be performed for the interharmonics. This development is based on the knowledge that it is only for the interharmonics that a corresponding measure is required in order to avoid the formation of critical vibration states. Therefore, apart from the frequency ranges for the interharmonics, there is no need for process guidance and thus t is possible to avoid intervention in an inverter controller or in the control unit. As a result, impacts on the quality of the control can be kept low.

According to a further embodiment, it is suggested that the processing of the filter output signal of the bandpass filter be transformed by means of a Park transformation in order to determine a d-component and a q-component, mean values determined for the d-component and the q-component, the mean values regulated to zero by means of a PI controller and the compensation signal determined by an inverse Park transformation. In this way, it is possible to determine the compensation signal from the filter output signal bandpass filter with lithe effort. Particularly advantageously, this embodiment can be used with a multi-pulse electric machine, for example a 6-pulse or 12-pulse electric machine or the like. As a result, the process guidance with respect to the control of the inverter can be greatly simplified. It is, for example, possible to use a vector rotator, which receives the filter output signal as an input signal and, in respect of a reference angle, provides a coordinate system rotating with the reference angle. Since only one input component needs to be used here, the d-component and the q-component can thus provide a DC component and a component with a double reference frequency as output signals of the vector rotator. Averaging can then reduce, or even completely suppress, the component with the double reference frequency.

In addition, it is suggested that the d-component and the q-component are in each case provided with their own PI controller. As a result, the d-component and the q-component can be regulated independently of one another.

A further embodiment suggests that the Park transformation and the inverse Park transformation be performed by means of a vector rotator using a reference angle. This enables the Park transformation to be performed in a simple manner. In addition, it is possible, if the control unit already comprises a vector rotator, for this also to be used at the same time to carry out the method according to the invention.

Preferably, the reference angle is determined at least taking into account a network angle, the network frequency, the machine frequency and a flux angle of the magnetic flux of the electric machine. As a result, a reference angle can be provided that is suitable for a very wide variety of applications in the context of the process guidance according to the invention.

The invention further suggests a computer program product comprising a program for a computing unit with program code sections of a program for carrying output the steps of the method according to the invention when the program is executed by the computing unit so that the computing unit determines at least one compensation signal. Particularly advantageously, the computer program product comprises a computer-readable medium on which the program code sections are stored. In addition, the program can be loaded directly into an internal memory of the computing unit. Thus, it is, for example, possible to download the program from a network of a data source, such as a server, and load it into an internal memory of the computing unit so that the computer can execute the program. The computing unit is preferably integrated in the control unit. The computing unit can also provide the control unit at the same time.

The advantages and effects stated for the method according to the invention also apply analogously to the computer program product and to the control unit.

BRIEF DESCRIPTION OF THE DRAWING

Further features and advantages may be derived from the following description of exemplary examples with reference to the attached figures. In the figures, the same reference characters denote the same features and functions.

The figures show in.

DETAILED DESCRIPTION OF PREFERRED EMBODIMENTS

Figure 1:
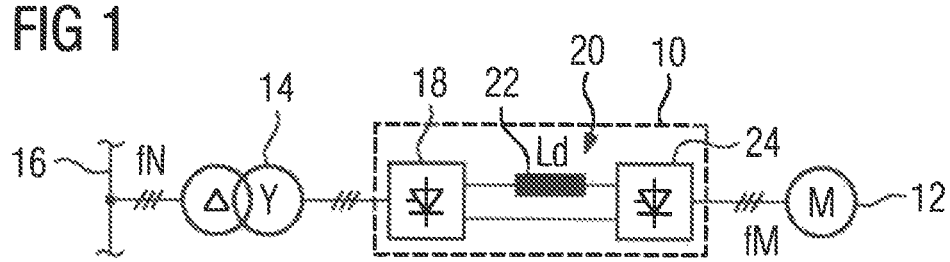
FIG. 1 a schematic block diagram of a first embodiment for an inverter designed as a 6-pulse inverter.

FIG. 1 is a schematic block diagram of a 6-pulse inverter 10 comprising a network-side converter 18 and a machine-side converter 24. The converter 18 and the converter 24 are electrically coupled to one another via a DC intermediate circuit 20. To this end, the DC intermediate circuit 20 comprises an inductor 22.

The converter 18 is connected to a secondary winding of a transformer 14 on the AC voltage side or AC current side. The transformer 14 comprises a primary winding, which is connected to a three-phase AC voltage network 16, here the public energy supply network. The transformer 14 is designed as a three-phase transformer, wherein its primary winding is interconnected in a delta connection and its secondary winding is interconnected in a star connection.

The converter 24 is connected on the AC voltage side or AC current side to a rotating electric machine 12 configured for three-phase operation. In the present case, the rotating electric machine 12 is a synchronous machine.

Figure 2:
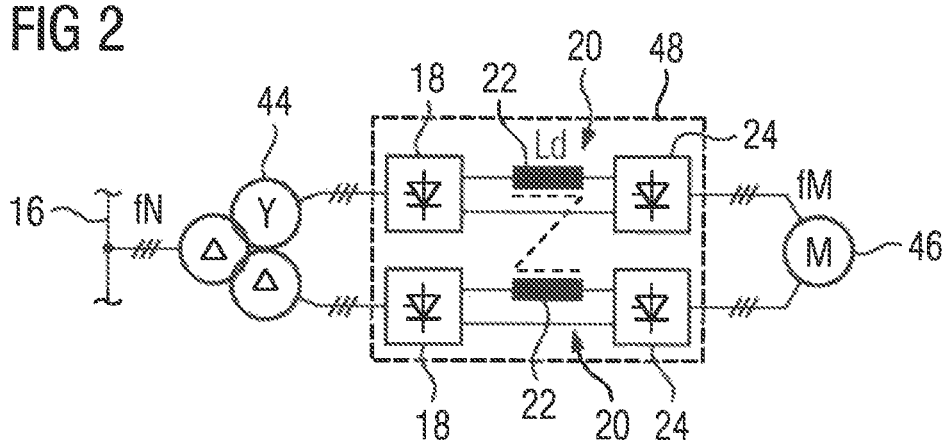
FIG. 2 a schematic block diagram of a second embodiment of an inverter designed as 12-pulse inverter and comprising two separate DC current intermediate circuits each comprising an intermediate circuit inductor, wherein the intermediate circuit inductors of the two intermediate circuits are coupled to one another magnetically.

FIG. 2 shows an alternative embodiment for an inverter 48, which in the present case is designed as a 12-pulse inverter. To this end, the inverter 48 comprises two network-side converters 18 and two machine-side converters 24, wherein in each case one of the converters 18 is electrically connected via a DC intermediate circuit 20 to an intermediate circuit inductor 22 to a respective one of the two machine-side converters 24, in the present case, it is provided that the two intermediate circuit inductors 22 of the two intermediate circuits 20 are magnetically coupled to one another. However, in alternative embodiments, it can also be provided that such a coupling is not provided.

On the machine side, the inverter 48 provides a 6-phase AC voltage network or AC current network to which a correspondingly equipped rotating electric machine 46 is connected. On the network side, the inverter 48 is connected to the three-phase AC voltage network 16 via a transformer 44. To this end, the transformer 44 comprises a primary winding in a delta connection, which is connected directly to the AC voltage network 16. In addition, the transformer 44 comprises two secondary windings of which one is in a star connection and another is in a delta connection, in each case, one of the two secondary windings is connected to one of the two network-side converters 18 of the inverter 48.

Figure 3:
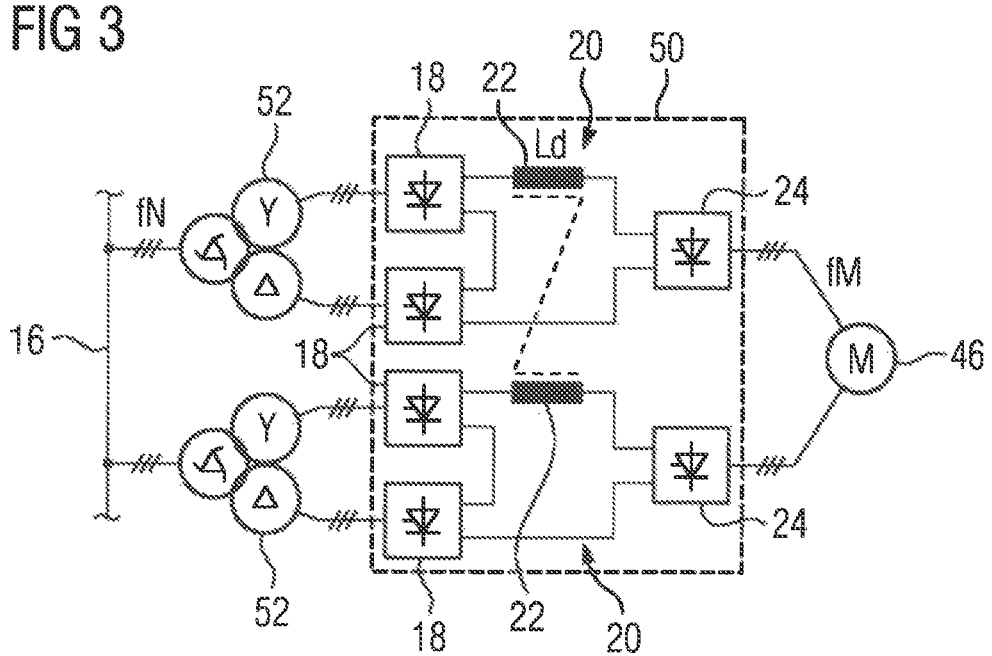
FIG. 3 a schematic block diagram of a third embodiment for an inverter designed as a 24-pulse inverter and comprising two separate DC current intermediate circuits with magnetically coupled intermediate circuit inductors, FIG. 4 a schematic diagrammatic representation of a Campbell diagram for an arrangement in FIG. 2, FIG. 5 a schematic diagrammatic representation based on FIG. 4 depicting a dependence of a reference frequency on a machine frequency and FIG. 6 a schematic block diagram for a control unit according to the invention.

FIG. 3 is a schematic block diagram of a further embodiment of an inverter 50, which, in the present case, is designed as a 24-pulse inverter. To this end, the inverter 50 comprises two machine-side converters 24, which—as already explained in respect of FIG. 2—are connected to the rotating electric machine 46. On the network side, the inverter 50 comprises four converters 18 connected in series on the DC current side in pairs in each case to one of two DC current intermediate circuits 20. Each of the DC current intermediate circuits 20 in turn comprises an intermediate circuit inductor 22, which are magnetically coupled in the present case. Here, the magnetic coupling is again optional and can be omitted in alternative embodiments. Hence, a respective, series-connected pair of network-side converters 18 is electrically coupled to one of the machine-side converters 24 via the respective DC intermediate circuit 20.

The inverter 50 is connected to the three-phase AC voltage network 16 via two transformers 52. To this end, each of the two transformers 52 comprises a primary winding, which, in the present case, is designed as a zigzag connection. On the secondary side, each of the transformers 52 has the same design as the transformer 44, i.e. each of the transformers 52 comprises two secondary windings, of which one is designed in a star connection and another in a delta connection.

In each case, one of the two transformers 52 is connected to one of the pairs of network-side converters 18, wherein one of the secondary windings is connected to a first one of the network-side converters 18 connected in series and the other one of the two secondary windings to the respective other one of the network-side converters 18. As a result, each transformer 52 couples one of the two DC current intermediate circuits 20 to the AC voltage network 16 via the respective network-side converters 18.

The inverter concepts for the inverters 10, 48, 50 depicted here solely by way of example are typically used with high powers, for example in the range of about one MW or more. However, basically, these connection concepts can also be used with lower powers.

With such drive concepts, so-called interharmonic oscillating torques can occur in a drive train or the electric machine—these can be caused by the fact that, as a rule, a network side and a machine side cannot be completely electrically decoupled. As a rule, the amplitudes of such oscillating torques are comparatively low, for example less than 2% of a rated torque or a running torque. However, if mechanical natural frequencies, which often lie in a frequency range of less than 50 Hz, are excited in the region of the electric machine 12, 46, an oscillating torque can adopt a much higher value, which can even be mechanically critical.

The invention is concerned with this problem. An intermediate circuit power in one of the DC current intermediate circuits 20 or a part of the DC intermediate circuit can be determined in accordance with:

$$Pd=Ud*Id+\Sigma_v\Sigma_\mu UD_v*\cos(\omega_v*t-\phi_v)*\cos(\omega_\mu*t-\phi_\mu)Ud.$$

Due to the intermediate circuit power determined by product formation, voltage harmonics with frequencies of 0 Hz, $6*f_N$, $6*f_M$, $12*f_N$, $12*f_M$, ... and the like and current harmonics with the same frequencies give rise to the frequencies shown in the following table:

| | | Intermediate circuit network side | |
|---|---|---|---|
| DC current ▼ | DC (cophasal) | 6 * fn (opposite) | 12 * fn (cophasal) |
| DC (cophasal) | DC | 6 * fn (opposite) | 12 * fn (cophasal) |
| 6 * fn (opposite) | 6 * fn (opposite) | DC 12 fn (cophasal) | 6 * fn 18 * fn (cophasal) |
| 12 * fn (cophasal) | 12 * fn (cophasal) | 6 * fn 18 * fn (cophasal) | DC 24 * fn (cophasal) |
| 6 * fm (opposite) | 6 * fm (opposite) | 6 * fm − 6 * fn, 6 * fm + 6 * fn (opposite) | 6 * fm − 12 * fn, 6 * fm + 12 * fn (opposite) |
| 12 * fm (cophasal) | 12 * fm (cophasal) | 12 * fm − 6 * fn, 12 * fm + 6 * fn (opposite) | 12 * fm − 12 * fn, 12 * fm + 12 * fn (cophasal) |

In the table, the first row and the first column are assigned to the current or voltage. The further tabular values relate to powers. The values in the table marked "cophasal" are cophasal in the two DC current intermediate circuits 20 with the 12-pulse inverter 48 in FIG. 2, while values labelled "opposite" are in phase opposition.

Particular attention should be paid to the following interharmonics in the intermediate circuit power which are shown in the table on the bottom right, namely:

$6*fm+/-6*fn$, $6*fm+/-12*fn$, $12*fm+/-6*fn$, $12*fm+/-12*fn$,

The values become negligible or zero in the vicinity of $f_M=0.5*f_N$, $f_M=f_N$ and $f_M=2*f_N$. At these positions, there is a risk of low-frequency power oscillations in the network and in the electric machine, which is equivalent to corresponding low-frequency torque oscillations.

In the case of a 12-pulse inverter, such as the inverter 48, with two separate DC current intermediate circuits 20, the phase position in the two DC current intermediate circuits 20 may result in the following interharmonics in the entire intermediate circuit power:

$6*f_M+/-6*f_N$ and $12*f_M+/-12*f_M$

At this point, then in particular a range around $f_M=f_N$ is critical.

Although, the above considerations relate to a 12-pulse inverter with two DC current intermediate circuits, they are equally applicable to other corresponding inverters, in particular to a 6-pulse inverter, such as the inverter 10, or a 24-pulse inverter, such as the inverter 50.

In order to avoid the problems caused by the interharmonics, the invention suggests that a machine power of the electric machine 12, 46 be modulated by modulating a control factor. This modulation enables the generation of the oscillation power in the electric machine, and hence of an oscillating torque in the aft gap, which is suitable to compensate the interharmonics in the air-gap torque. To this end, a DFT controller can be used to minimize the internal harmonics, as explained below, FIG. 4 is a schematic graphical representation of a Campbell diagram for the inverter in FIG. 2. An abscissa of the diagram in FIG. 4 is assigned to a machine frequency, while an ordinate is assigned to a mechanical frequency of the electric machine 12, 46. In deviation therefrom, in literature, the abscissa is often also assigned to the speed of the electric machine. Reference number 54 designates a critical mechanical frequency of the drive train in the diagram in FIG. 4. FIG. 4 also depicts angles 56 and 58 based on the network frequency. The angle 56 is assigned to $12*|f_{mot}-f_{network}|$. The angle 58 is assigned to $6*|f_{mot}-f_{network}|$. The frequencies $f_1$, $f_2$, $f_3$ and $f_4$, which represent critical natural frequencies of the rotating electric machine, in particular in respect of the mechanical drive train, can be derived from the points of intersection of the angles 56, 58 with the critical frequency 54. Hence, the machine frequencies at which the critical natural frequency of the shaft train is excited are derived from the points of intersection. Since, in the present case, only these frequencies are critical, regulation according to the invention is also only necessary at these frequencies. The mechanical machine-side natural frequencies are inter alia based on manufacturer documentation. Since, here, it is necessary to take account of tolerances, it is provided in the present case that a corresponding regulation or process guidance takes place not only exactly at the respective frequencies, but also in a certain range around the frequencies $f_1$, $f_2$, $f_3$ and $f_4$.

The process guidance preferably uses a reference system, which inter alia takes account of a mechanism of action with respect to the interharmonics. The reference system in particular comprises a reference angle 42, which is already used in existing control units 26 (FIG. 6) for the inverters 10, 48, 50 in order to control them, FIG. 5 shows in a further schematic diagram a reference frequency for correcting interharmonic oscillation powers. An abscissa is in turn assigned to a machine frequency, while an ordinate is assigned to the reference frequency. Reference number 54 again designates a straight line, which is parallel to the abscissa and designates the critical frequency of the drive train. It can be seen is that, in the range of the frequencies $f_1$, $f_2$, $f_3$ and $f_4$, the critical frequency 54 does not have a constant value, but is represented by a straight section 60, 62, 64, 66 around the respective aforementioned frequencies. Outside a tolerance range around the frequencies fi, f2, 13 and f4, the reference frequency is set to the critical frequency. Within a tolerance range around the frequencies $f_1$, $f_2$, $f_3$ and $f_4$, the reference frequency is guided in accordance with the mechanism of formation of the interharmonics with 6*(fn+/−fmot) or 12*(fn+/−fmot) on the straight-line sections 60, 62, 64, 66. Hence, by means of suitable process guidance, it is possible to achieve strong attenuation of the relevant interhamionics.

Figure 6:
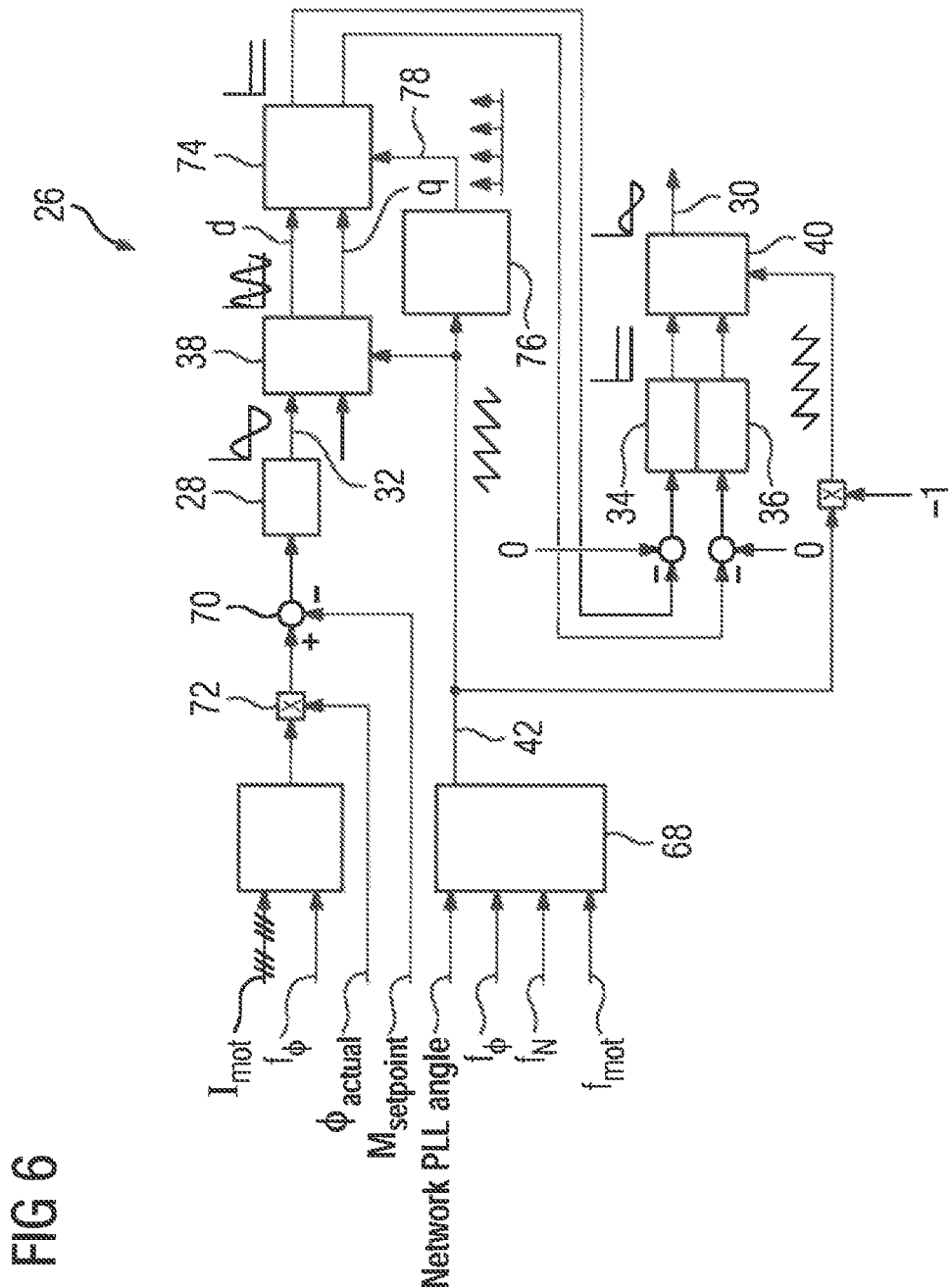

FIG. 6 now shows a schematic block diagram of a control unit 26 according to the invention, which is designed to implement process guidance for the suppression of critical oscillation powers. The following exemplary embodiment is explained in more detail for the inverter 48 in FIG. 2. In the present case, the critical frequency corresponds to a natural frequency of a shaft train comprising a shaft of the electric machine.

First, torque-related machine-current components composed of electric machine currents of the electric machine 46 are determined. To this end, the torque-producing machine-current components are calculated from the six currents provided on the inverter side for the electric machine 46. This can take place in that the component of a current space vector is determined perpendicular to a flux space vector. Then, an actual value for a magnetic flux of the electric machine 46 is determined and the torque-producing machine-current component linked to the actual value determined for the magnetic flux by multiplying by means of a multiplier 72. Herein, frequencies of the interharmonics can be determined from $6*(f_{network}-f_{mot})$ or $12 (f_{network}-f_{mot})$. An ordinal number can be determined from the range in FIG. 4 in which the machine frequency is located. The process guidance or regulation can be deactivated between the ranges in FIG. 4.

In the present case, the reference angle 42 is determined from angles, which form the reference system for control data and hence also for all the network and machine harmonics:

Reference angle=6*(network angle−flux angle)

or

Reference angle=sign 12*(network angle−flux angle)

To this end, the control unit 26 comprises a reference system unit 68.

The control unit 26 uses digital signal processing in order to carry out the process guidance. To this end, the control unit 26 comprises a computing unit, not shown, which is controlled by means of a suitably designed computer program so that the desired function is provided by the control unit 26.

Herein, in the present case, edge detection of the reference angle 42 at the end of a respective period of the interharmonics is used to set a reset signal. Since all the signals are sampled for the purposes of digital signal processing, jitter occurs here in respect of a number of sampling intervals in a respective period.

A setpoint value for the torque $M_{setpoint}$ is subtracted from the actual value of the torque by means of a subtractor 70. The result signal of the subtraction by the subtractor 70 is applied to a bandpass filter 28. In the present case, the bandpass filter 28 is designed as a second order filter. The bandpass filter 28 is tuned to the mechanical natural frequency of the drive train or the electric machine 12, 46 or $6*(f_{network}-f_{mot})$ or $12*(f_{network}-f_{mot})$.

A filter output signal 32 of the bandpass filter 28 is applied to a vector rotator 38 by means of which, according to a Park transformation, a coordinate system rotating with the reference angle 42 is provided. Since, in the present case, there is only one single input component, in each of the components, namely the d-component and the q-component, the vector rotator 38 generates a DC component and a component with the double reference frequency. The d-component and the q-component are then sent to an averaging device 74 that performs averaging for the two components over a period of the reference frequency. As a result, the component is suppressed or eliminated with respect to the double reference frequency. To this end, a trigger unit 76 can be used to generate a trigger signal 78 for the averaging device 74 from the reference angle 42.

The averaged components provided by the averaging device 74 are then in each case sent to their own PI controllers 34, 36, which regulate them to zero in each case. The corresponding output signals from the PI controller 34, 36 are then back-transformed by means of a further vector rotator 40 so that a preferably sinusoidal modulation signal is available to be used for modulation or superimposition on the network control signal and/or the machine control signal.

Modulation signal=Regulator output_$d$*cos(reference angle)+regulator output_$q$*sin(reference angle)

With the invention, it is thus possible for a process guidance only to require variables that are already available in the inverter 10, 48, 50. Therefore, no further measured values of the electric machine are required, in particular in respect of a torque provided on a shaft of the electric machine 12, 46. Substantially, neither does the implementation of the invention require information on the drive train or the electric machine with respect to their mechanical properties.

Overall, the invention provides the following advantages:

The air-gap power and the air-gap torque of the electric machine only need to be calculated from the actual value of the electric voltage and the actual value of the electric current for the electric machine.

The ordinal numbers for the respective interharmonics can be selected by means of the Campbell diagram. Herein, the selection can be made in dependence on a speed of the electric machine, which does not excite any critical mechanical natural frequency of the electric machine or the drive train. As a rule, the lowest of the mechanical natural frequencies is found to be particularly critical. Based on this, speed ranges are defined that take into account the ordinal numbers and allow for the tolerances in respect of the mechanical natural frequencies, wherein the regulation is preferably only activated in these speed ranges. In addition, the selection of the ordinal numbers can also be dependent on the respective inverter topology. In the case of other inverter topologies, it is also possible to select other ordinal numbers or combinations of ordinal numbers.

The reference system for the interharmonics can be determined from a network PLL (phase locked loop), a flux angle (basis for the machine-side trigger circuitry) and the ordinal numbers. The reference system contains a reference frequency and a reference phase angle or reference angle.

Filtering with the reference frequency, in particular bandpass filtering, of the actual value of the air-gap torques, from which a setpoint value for the torque can be subtracted in advance, can be carried out, wherein the reference frequency depends on the network frequency and the machine speed and is entrained accordingly.

It is also possible for vector rotation with the reference angle and averaging of the filtered signal to be provided, wherein the vector rotation corresponds to a digital Fourier transform (DFT). The output signals obtained by the vector rotation describe the two Cartesian components of the DFT.

The two Cartesian components are preferably sent to two PI controllers, which regulate these components to zero. Output signals from the PI controllers obtained in this way can be back-transformed again by means of vector rotation using the reference angle so that a modulation signal is obtained, which can preferably be sinusoidal.

The modulation signal or compensation signal 30 can be used to control the converter such that an oscillation power is impressed, which compensates the corresponding interharmonic air-gap power and hence the corresponding interharmonic air-gap torque.

The above exemplary embodiments are only intended to explain the invention and not to limit the invention. Obviously, if required, the person skilled in the art will provide corresponding variants and adaptations without departing from the basic concept of the invention.

Obviously, individual features can also be combined in any way with one another according to requirements.

In addition, obviously, apparatus features may also be achieved by corresponding method steps and vice versa.

What is claimed is:

1. A method for operating an inverter which couples an electric machine designed for operation on AC voltage to an AC voltage network, wherein the inverter is coupled to a network-side converter connected to the AC voltage network by means of a DC intermediate circuit,
the method comprising controlling the network-side converter with a network control signal and controlling conversion of electric energy by the machine-side converter with a machine control signal from a control unit:
determining a torque-related machine current component from electric machine currents of the electric machine,
detecting an actual value for a magnetic flux,
determining an actual value of a machine torque of the electric machine by linking the detected magnetic flux to the torque-related machine current component,
determining a torque difference between the actual value of the machine torque and a setpoint value of the machine torque of the electric machine,
filtering the torque difference with a bandpass filter tuned to a machine-side natural frequency to determine a filter output signal,
processing the filter output signal with a Park transformation to determine a d-component and a q-component,
determining mean values for the determined d-component and q-component,
regulating the mean values to zero with a PI controller,
determining a compensation signal with an inverse Park transformation, and
superimposing the compensation signal determined with the inverse Park transformation on the network control signal or the machine control signal, or both.

2. The method of claim 1, further comprising determining frequency ranges for interharmonics from a network frequency and a machine frequency, in particular a machine speed.

3. The method of claim 2, wherein the method is carried out only for the determined interharmonics.

4. The method of claim 1, wherein a separate PI controller is provided for the d-component and the q-component.

5. The method of claim 1, wherein the Park transformation and the inverse Park transformation are performed with a vector rotator using a reference angle.

6. The method of 5, wherein the reference angle is determined by taking into account at least one of a network angle, a network frequency, a machine frequency and a flux angle of the magnetic flux.

7. A computer program product residing on a non-transitory computer readable medium and comprising a program having program code sections, wherein the program code sections, when read into a memory of a processor of a control unit and executed by the processor of the control unit, causes the control unit to:
control the network-side converter with a network control signal and controlling conversion of electric energy by the machine-side converter with a machine control signal,
determine a torque-related machine current component from electric machine currents of the electric machine,
detect an actual value for a magnetic flux,
determine an actual value of a machine torque of the electric machine by linking the detected magnetic flux to the torque-related machine current component,
determine a torque difference between the actual value of the machine torque and a setpoint value of the machine torque of the electric machine,
filter the torque difference with a bandpass filter tuned to a machine-side natural frequency to determine a filter output signal,
process the filter output signal with a Park transformation to determine a d-component and a q-component,
determine mean values for the determined d-component and q-component,
regulate the mean values to zero with a PI controller,
determine a compensation signal with an inverse Park transformation, and
superimpose the compensation signal determined with the inverse Park transformation on the network control signal or the machine control signal, or both.

8. A control unit for operating an inverter coupling an electric machine operating on AC voltage to an AC voltage network, wherein the inverter comprises a network-side converter connected to the AC voltage network and a machine-side converter connected to the electric machine and electrically coupled to the network-side converter by way of a DC intermediate circuit,
the control unit comprising a network-side connector configured for connection to the network-side converter and providing a network control signal to control the network-side converter, and a machine-side connector configured for connection to the machine-side converter and providing a machine control signal to control the machine-side converter,
the control unit further configured to:
determine a torque-related machine current component from electric machine currents of the electric machine,
detect an actual value for a magnetic flux, determine an actual value of a machine torque of the electric machine by linking the detected magnetic flux to the torque-related machine current component, determine a torque difference between the actual value of the machine torque and a setpoint value of the machine torque of the electric machine, filter the torque difference with a bandpass filter tuned to a machine-side natural frequency to determine a filter output signal, process the filter output signal with a Park transformation to determine a d-component and a q-component, determine mean values for the determined d-component and q-component, regulate the mean values to zero with a PI controller, determine a compensation signal with an inverse Park transformation, and superimpose the compensation signal determined with the inverse Park transformation on the network control signal or the machine control signal, or both.

\* \* \* \* \*